Aug. 8, 1950        P. BASTIE        2,517,962
FISH LURE
Filed July 25, 1947
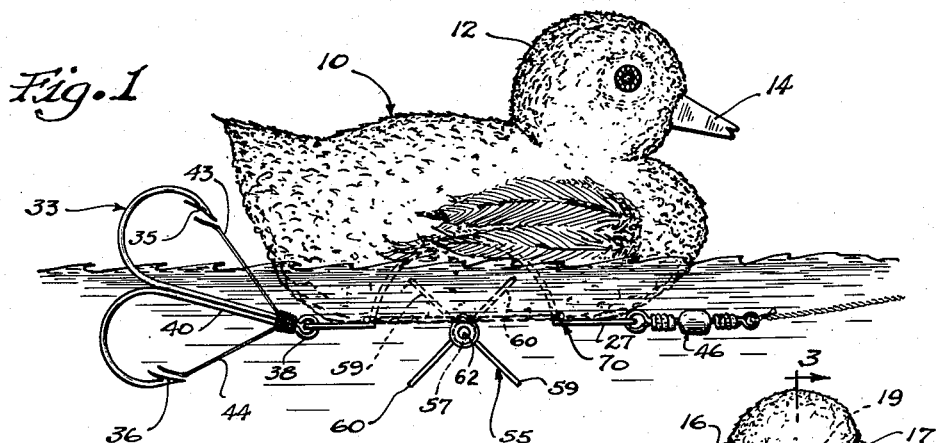
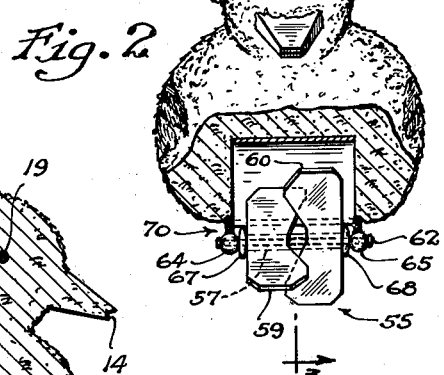
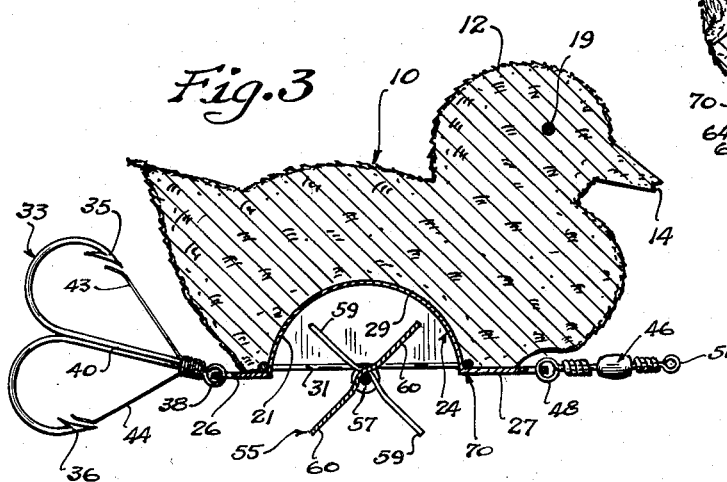
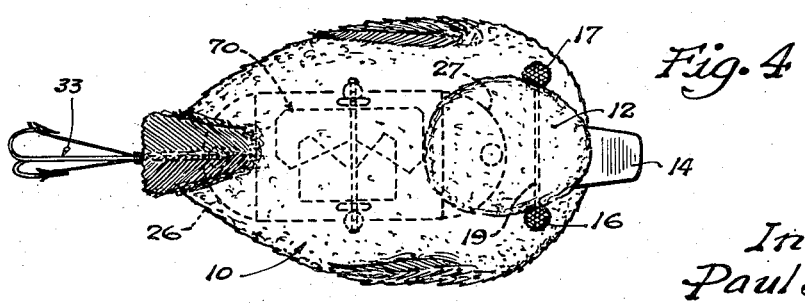
Inventor
Paul Bastie
By Wallace and Cannon
Attorneys Patented Aug. 8, 1950

2,517,962

UNITED STATES PATENT OFFICE 2,517,962

FISH LURE

Paul Bastie, Chicago, Ill.

Application July 25, 1947, Serial No. 763,719

5 Claims. (Cl. 43—42.12)

This invention relates to an artificial fish-lure, and particularly to a fish-lure adapted to simulate a duckling or the like, swimming on the water.

I have found that certain of the so-called "game-fish" will strike or attack small birds such as, for example, ducklings, swimming on the water, and it is a primary object of my invention to arrange a novel fish-lure in such a manner that, when pulled through the water, it will simulate a duckling in a realistic manner.

Another object of my invention is to so construct my novel fish-lure that, when pulled on a fish-line along the surface of a body of water, it will take an erratic or zig-zag course in simulation of a duckling.

A further object is to construct a fish-lure which, when pulled through the water, will disturb the water immediately below and immediately behind the lure in simulation of a live duckling swimming on the water.

Another object is to arrange hooks on my lure in such a manner that, when my novel lure is drawn across the water, the water disturbed by the lure tends to obscure the hooks from the view of fish in the water therebelow.

Yet another object of my invention is to construct a fish-lure having a substantially bird-like body and a paddle wheel associated with each other in a novel and expeditious manner.

A further object of my invention is to so construct my novel fish-lure that in the manufacture thereof, the body member may be constructed of one piece, and a base unit, comprising the aforesaid paddle wheel, fish hooks, and a pulling member, may be constructed as another piece and the two pieces may then be readily attached together.

Other and further objects of the present invention will be apparent from the following description and claims and are illustrated in the accompanying drawings which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a side elevational view of a fish-lure embodying the principles of my invention and showing the fish-lure as it would appear when floating on the water;

Fig. 2 is a front elevational view of the fish-lure shown in Fig. 1, parts thereof being broken away to show certain internal parts;

Fig. 3 is a sectional view taken substantially along the line 3—3 in Fig. 2; and Fig. 4 is a top plan view of the fish-lure shown in Fig. 1.

The novel fish-lure shown in the accompanying drawings to illustrate the preferred embodiment of my invention has a body member 10, including a head 12 and a beak or bill 14 projecting forwardly therefrom. The body member 10 is shaped to correspond substantially to the shape of a duckling and may be made of any suitable buoyant material such as cork. Two eyes 16 and 17, which may be formed of buttons or the like, are attached to the head 12 by suitable means such as a pin 19.

A substantially arcuate-shaped recess 21 is formed in the central lower portion of the body member 10, for a purpose which will be discussed in greater detail hereinafter.

The body member 10, including the head 12 and the beak 14 should be properly decorated to give the fish-lure a life-like appearance, and to accomplish this I prefer to paint certain portions of the body member such as the head 12 and the beak 14 a suitable color and glue decorative feathers to the body member 10 with a suitable water-proof glue.

A substantially U-shaped frame member 24, made of any suitable material such as sheet metal and having two substantially parallel outer legs 26 and 27 interconnected by an intermediate leg 29 having a shape substantially complementary to that of the recess 21, is mounted on the body member 10 with the intermediate leg 29 mounted in the recess 21 and the two outer legs 26 and 27 in juxtaposition to the rear and front portions, respectively, of the bottom surface of the body member 10. A substantially rectangular-shaped annular supporting member 31, made of any suitable material such as wire, encircles the intermediate leg 29 of the frame member 24 and is attached to the outer legs 26 and 27 by any suitable means such as soldering.

A double hook 33 having two barbs 35 and 36 is attached to the outer leg 26 of the frame member 24 by a ring 38 formed on the end portion of the shank 40 of the hook 33. The hook 33 is preferably of the so-called "weedless" type and has two guard members 43 and 44 extending from the shank 40 toward the barbs 35 and 36, respectively, to shield the barbs from weeds and the like.

A suitable pulling member, such as a swivel 46, is connected to the outer leg 27 of the frame member 24 by a ring 48, and the swivel 46 has another ring 50 attached to the other end thereof to which a fish-line may be attached for pulling the lure through the water.

A paddle wheel 55, having a hub 57 from which two sets of paddles 59 and 60 project radially, is rotatively mounted on a shaft 62 carried by suitable brackets 64 and 65, Fig. 2, depending from respective side portions of the supporting member 31, the upwardly positioned paddles 59 and 60 projecting into the recess 21 and the lower paddles projecting downwardly below the body member 10. Two spacing members or washers 67 and 68 are mounted on the shaft 62 between the hub 57 and the brackets 64 and 65, respectively, to insure free rotation of the paddle wheel 55.

The two sets of paddles 59 and 60 extend from the hub 57 substantially perpendicularly to each other, Figs. 1 and 3, and each have inwardly disposed portions 59a and 60a, Fig. 2, which overlap each other. Thus it will be seen that as the lure is pulled forwardly through the water, or to the right as viewed in Fig. 1, the force of the water acting on the downwardly projecting paddles will cause the paddle wheel 55 to rotate in a counterclockwise direction as viewed in Fig. 1 so that the downwardly projecting paddles 59 and 60 will move rearwardly below the body member 10 and will disturb the water in simulation of the feet of a swiming duckling. Also it will be seen that, the paddles 59 and 60 being disposed substantially perpendicularly to each other at opposite ends of the hub 57, they will be driven substantially alternately by the water so that a drag will be created first on one side and then on the other of the body member 10 and will cause the lure to follow an erratic or zig-zag course. A fisherman can vary and control the amount of wobbling or zig-zagging that the lure will do when being pulled through the water, by varying the speed at which the lure is pulled through the water and by varying the tension on the fish-line.

The wake or disturbance of the water caused by the movement of the body member 10 and the over-lapping paddles 59 and 60 assists in hiding or obscuring the hook 33 from view. Because of the overlapping of the portions 59a and 60a of the paddles 59 and 60 in the movement thereof through the water, the wakes created behind the paddles 59 and 60, respectively, overlap somewhat to accentuate the disturbance of the water, which assists in hiding the hook 33 from view and adds to the allure or attractiveness of my novel fish-lure.

In the construction or manufacture of my novel fish-lure the frame member 24, the supporting member 31, the brackets 64 and 65, the shaft 62, the paddle wheel 55, the hook 33 and the swivel 46 may all be assembled as a one-piece base unit 70, which may then be properly positioned on the body member 10, with the frame member 24 mounted in the recess 21, and may be secured thereto by any suitable means such as, for example, by gluing the intermediate leg 29 and the outer legs 26 and 27 of the frame member 24 to the body member 10 with a suitable water-proof glue.

From the foregoing it will be seen that I have provided a novel fish-lure which when pulled through the water in a forward direction very closely simulates the appearance and action of a duckling swimming on the water.

Also, it will be seen that my novel fish-lure may be readily and economically manufactured, the body member 10 being formed as one part and the base unit 70 being formed and assembled as a separate part and then the two parts being readily and easily attached together to form a complete fish-lure.

Hence, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. A fish-lure comprising a body member adapted to float on water, said body member having a recess formed therein, a substantially U-shaped supporting member mounted in said recess and having two outwardly projecting legs, an elongated member extending between and carried by said legs, a paddle wheel comprising a hub, a plurality of paddles projecting radially from one end portion of said hub, and another plurality of paddles projecting radially from the other end portion of said hub, all said paddles projecting from each end of said hub being out of alignment, longitudinally of said hub, with all the paddles projecting from the other end portion of said hub, a shaft extending through said hub and connected to said elongated member for rotatably supporting said paddle wheel, a portion of said paddle wheel projecting into said recess and another portion thereof projecting below said body member, a hook connected to said supporting member, and a pulling member connected to said supporting member for pulling said body member.

2. An artificial fish-lure comprising a substantially bird-shaped body member made of buoyant fibrous material and having a recess formed in the bottom thereof, and a base unit attached thereto, said base unit comprising a substantially U-shaped member mounted in said recess and having two outer legs, one of said legs being disposed toward the front of said body and extending substantially parallel thereto, and the other of said legs being disposed toward the rear of said body and extending substantially parallel thereto, a hoop-shaped member encircling said U-shaped member and mounted on said legs, a shaft connected to said hoop-shaped member and supported thereby substantially transversely to the longitudinal axis of said body, a paddle wheel comprising a hub rotatably mounted on said shaft and a plurality of paddles projecting radially from said hub, certain of said paddles projecting radially from one end portion of said hub and the other of said paddles projecting radially from the other end portion of said hub, said paddles at each end portion of said hub overlapping paddles at the other end portion of said hub, and said paddles at each end portion of said hub being out of alignment axially of said hub with the paddles at the other end portion thereof, a hook attached to said other outer leg substantially in alignment with said paddle wheel longitudinally of said body, and a connecting member attached to said one outer leg for connecting a fish-line thereto.

3. A fish-lure comprising an elongated body member adapted to float on water, said body member having a front end portion, a rear end portion, a top side and a bottom side, said body member having a recess formed in the bottom thereof, and a base unit mounted on, and removable from, said bottom of said body member as a unit, said base unit comprising a frame member mounted in said recess and having two outwardly projecting legs, one of said legs projecting forwardly from said recess below said bottom side of said body member, the other of said legs projecting rearwardly from said recess below said bottom side of said body member, a paddle wheel in said recess rotatably mounted on said frame member and having a portion extending below said body member, a hook attached to said other leg, and means on said one leg for pulling said body member through water on which it is floating to thereby cause said paddle wheel to rotate.

4. A fish-lure comprising an elongated body member adapted to float on water, said body member having longitudinally extending upper and lower portions, a recess formed in said lower portion of said body member, bearing means mounted on said lower portion of said body member, a paddle wheel rotatably mounted on said bearing means for rotation around an axis disposed substantially transversely to the longitudinal axis of said body member, said paddle wheel comprising an elongated hub, a plurality of paddles projecting radially from one end portion of said hub, and a plurality of paddles projecting radially from the other end portion of said hub, at least one paddle on each end of said hub being out of alignment with any paddle on the other end of said hub, a portion of said paddle wheel projecting into said recess and another portion of said paddle wheel projecting below said body member, a hook mounted on one end portion of said body member, and means on the other end portion of said body member for pulling said body member.

5. A fish-lure as defined in claim 4, and in which outwardly projecting portions of said paddles at each end portion of said hub overlap paddles at the other end portion of said hub.

PAUL BASTIE.

REFERENCES CITED

The following references are of record in the file of this patent:

UNITED STATES PATENTS

| Number | Name | Date |
| --- | --- | --- |
| 1,313,476 | Ewert | Aug. 19, 1919 |
| 2,341,234 | O'Byrne | Feb. 8, 1944 |
| 2,450,253 | Parnell, Sr. | Sept. 28, 1948 |